United States Patent [19]

Tobias et al.

[11] Patent Number: 5,068,033
[45] Date of Patent: Nov. 26, 1991

[54] UNDERDRAIN ASSEMBLY WITH PIVOTALLY-MOUNTED AND LOCKABLE LATERALS

[75] Inventors: Samuel Tobias, Edison; Fred T. Hazlehurst, Union, both of N.J.

[73] Assignee: Hayward Industries, Inc., Elizabeth, N.J.

[21] Appl. No.: 521,610

[22] Filed: May 10, 1990

[51] Int. Cl.⁵ .................................................. B01D 35/31
[52] U.S. Cl. ....................................... 210/169; 210/232; 210/345; 210/291; 210/293
[58] Field of Search ............... 210/169, 232, 345, 288, 210/289, 279, 291, 293; 285/132, 921, 32, 134

[56] References Cited

U.S. PATENT DOCUMENTS

| | | | |
|---|---|---|---|
| 604,573 | 5/1898 | Wilson | 210/291 |
| 3,625,365 | 12/1971 | Armstrong et al. | 210/232 |
| 3,647,083 | 3/1972 | Niccum et al. | 210/345 |
| 3,747,768 | 7/1973 | Barrera | 210/288 |
| 3,984,327 | 10/1976 | May | 210/345 |
| 4,169,793 | 10/1979 | Lockshaw | 210/169 |
| 4,216,093 | 8/1980 | Kane et al. | 210/345 |
| 4,478,716 | 10/1984 | Hasegawa et al. | 210/289 |
| 4,753,726 | 6/1988 | Suchanek | 210/232 |
| 4,941,975 | 7/1990 | Schewe | 210/232 |

FOREIGN PATENT DOCUMENTS

| | | | |
|---|---|---|---|
| 12576 | of 1898 | United Kingdom | 210/291 |
| 5372 | of 1902 | United Kingdom | 210/345 |

Primary Examiner—Robert A. Dawson
Assistant Examiner—Joseph Drodge
Attorney, Agent, or Firm—Ralph W. Selitto, Jr.

[57] ABSTRACT

An underdrain assembly contained within a swimming pool filter has a plurality of laterals, each of which is pivotable between a non-operating position and an operating position. Each of the laterals is threadedly attached to the underdrain assembly so that they can be replaced individually by unscrewing them from the underdrain assembly without removing the underdrain assembly from the filter. The laterals can be locked in their operating positions by either a reversible locking mechanism or an irreversible locking mechanism. With the laterals in their non-operating positions, the underdrain assembly and the laterals can be inserted into the filter as a unit.

16 Claims, 3 Drawing Sheets

UNDERDRAIN ASSEMBLY WITH PIVOTALLY-MOUNTED AND LOCKABLE LATERALS

FIELD OF THE INVENTION

The present invention relates to an underdrain assembly for swimming pool filters, and, more particularly, to such an underdrain assembly having pivotally-mounted laterals.

BACKGROUND OF THE INVENTION

Swimming pools are often equipped with filter units to remove particulate and gelatinous contaminants from swimming pool water. A typical filter unit includes a tank and an underdrain assembly located therein. The underdrain assembly is positioned at the bottom of the tank and is covered with a filtrate medium, such as sand. Dirty pool water is injected into the tank and onto the sand. As the water flows through the sand, it is filtered of its contaminants. The filtered water collects at the bottom of the tank. The underdrain assembly separates the filtered water from the filtrate medium prior to the return of the filtered water to the swimming pool.

A typical underdrain assembly is disclosed in U.S. Pat. No. 3,625,365 in which a plurality of laterals extend radially from a center collector hub. The laterals, which function to separate the filtered water from the filtrate medium, are rigidly snap-locked onto the center collector hub. Such an underdrain assembly is difficult to insert into a filter tank through the usual opening provided in the top thereof. First, the center collector hub must be inserted into the tank. Then, each lateral must be inserted into the tank and snap-locked onto the central collector hub. Since a person must place his arms through the opening in the top of the tank in order to assemble the underdrain, the assembly process is very cumbersome and time consuming. Alternately, a tank comprising upper and lower halves can be employed. The assembled underdrain is placed in the lower half of the tank, and sealed with the upper half. However, such a two-piece tank design is undesirable.

The prior art is replete with underdrain assemblies that overcome the assembly problems mentioned above. For example, U.S. Pat. Nos. 3,747,768 and 4,753,726 disclose underdrain assemblies having laterals that are pivotally mounted to a central collector hub. At one end of each lateral is a ball which fits into a corresponding socket located in the central hub. The laterals are folded up and inserted through an opening in the top of the tank. Once inside the tank, the laterals are folded downward into their operating positions.

Problems still exist with underdrain assemblies, such as those disclosed in U.S. Pat. Nos. 3,747,768 and 4,753,726, which employ pivotally-mounted laterals. For instance, if the laterals are not properly aligned, the performance of the filter is degraded. Once unfolded, the pivotally-mounted laterals of such underdrain assemblies are free to move, thereby creating the possibility of subsequent misalignment and hence ineffective filter operation. Furthermore, if a single lateral of such an underdrain assembly needs to be removed for cleaning or replacement purposes, the entire underdrain assembly must be withdrawn from the tank and the central hub must be disassembled. This procedure is both time consuming and burdensome.

SUMMARY OF THE INVENTION

The problems associated with the underdrain assemblies discussed above are overcome by the present invention which relates to a new and improved underdrain assembly for swimming pool filters and the like. More particularly, the underdrain assembly employs a plurality of laterals adapted to pivot between non-operating positions, which facilitate insertion and removal of the underdrain assembly, and operating positions, which essentially prevent insertion and removal of the underdrain assembly.

In accordance with one aspect of the present invention, the laterals are individually detachable from the underdrain assembly so that they can be removed for replacement and/or repair purposes without requiring the removal of the entire underdrain assembly. By threadedly connecting the laterals to the underdrain assembly, they can be screwed onto or off of such assembly.

Another aspect of the invention involves locking the laterals in their operating positions to thereby prevent them from moving out of such positions. The laterals can be locked in their operating positions by employing either a reversible locking mechanism or an irreversible locking mechanism.

BRIEF DESCRIPTION OF THE DRAWINGS

For a better understanding of the present invention, reference is made to the following description of an exemplary embodiment considered in conjunction with the accompanying drawings, in which.

DETAILED DESCRIPTION OF THE EXEMPLARY EMBODIMENT

Although the present invention is applicable to many different types of filtering systems, it is especially suitable for use in connection with a filtering system for a swimming pool. Accordingly, the present invention will be described in connection with a filtering system for a swimming pool.

Figure 1:
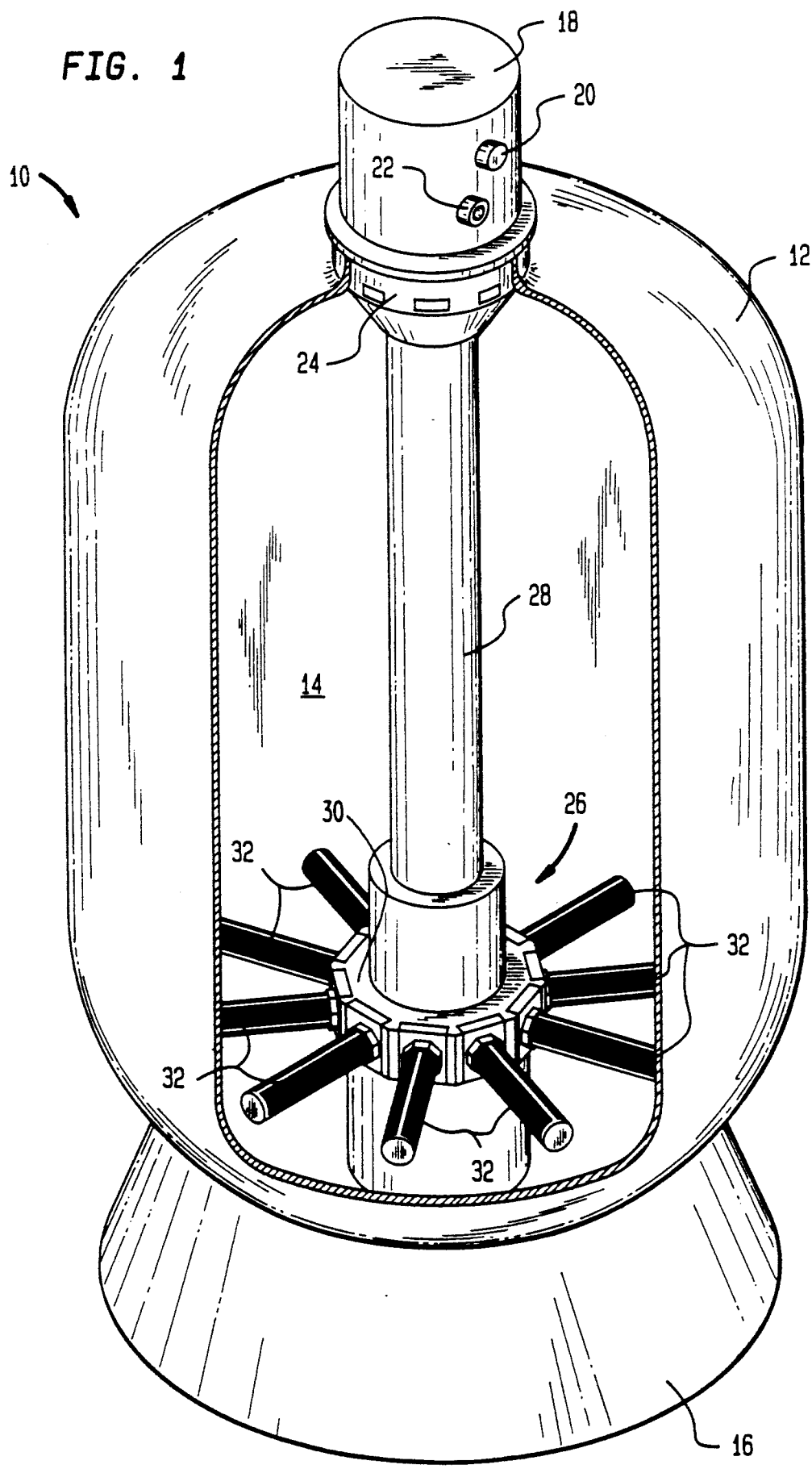
FIG. 1 is a perspective view of a filter unit employing an underdrain assembly constructed in accordance with one exemplary embodiment of the present invention, a section of the filter unit being removed to facilitate consideration and discussion.

Referring to FIG. 1, there is shown a filter unit 10 having a unitized filter tank 12 which defines an internal chamber 14. A restricted opening (not shown) at the top of filter tank 12 provides a passageway into the chamber 14. The filter tank 12 is injection molded of a polymeric material that can withstand corrosion and weathering. A skirt 16, injection molded of synthetic organic plastic such as ABS, is attached to the base of the filter tank 12 to provide support above ground level.

A control valve assembly 18 is positioned within the restricted opening and attached to the filter tank 12 by such means as a stainless steel flange clamp (not shown). The filter tank 12 and the control valve assembly 18 are sealed by an O-ring (not shown) or the like. The control valve assembly 18 is provided with an inlet port 20, which allows unfiltered pool water to enter the control valve assembly 18, and an outlet port 22, which allows filtered water to exit the control valve assembly 18. The control valve assembly 18 is also provided with a diffuser 24 located within the filter tank 12 so as to distribute the unfiltered water into the chamber 14. The diffuser 24 is provided with a central passageway (not shown) which communicates with the outlet port 22.

The filter tank 12 is substantially filled with a filtrate medium (not shown) such as any suitable silica sand. The diameters of the sand particles typically range between 0.45 millimeters and 0.55 millimeters.

An underdrain assembly 26, which is buried beneath the filtrate medium, communicates with the outlet port 22 of the control valve assembly 18 through a center pipe 28. The underdrain assembly 26 includes a housing-like holder 30 for a plurality of laterals 32, each of which is pivotally attached to the holder 30. When positioned to extend radially from the holder 30 (i.e, when they are in their operating positions), the laterals 32 communicate with the outlet port 22 by way of the center pipe 28.

During a normal filtering operation, dirty pool water enters the internal chamber 14 of the filter tank 12 through the inlet port 20 and the diffuser 24, which functions to evenly distribute the water over the top of the filtrate medium. As the water flows toward the bottom of the filter tank 12, the filtrate medium removes contaminants therefrom. Filtered water collecting in the bottom of the filter tank 12 is drawn into the laterals 32, which block the passage of the filtrate medium. From the laterals 32, the filtered water is pumped through the holder 30, through the center pipe 28, through the central passageway in the diffuser 24, through the outlet port 22 of the control valve assembly 18 and finally back into the swimming pool.

Figure 2:
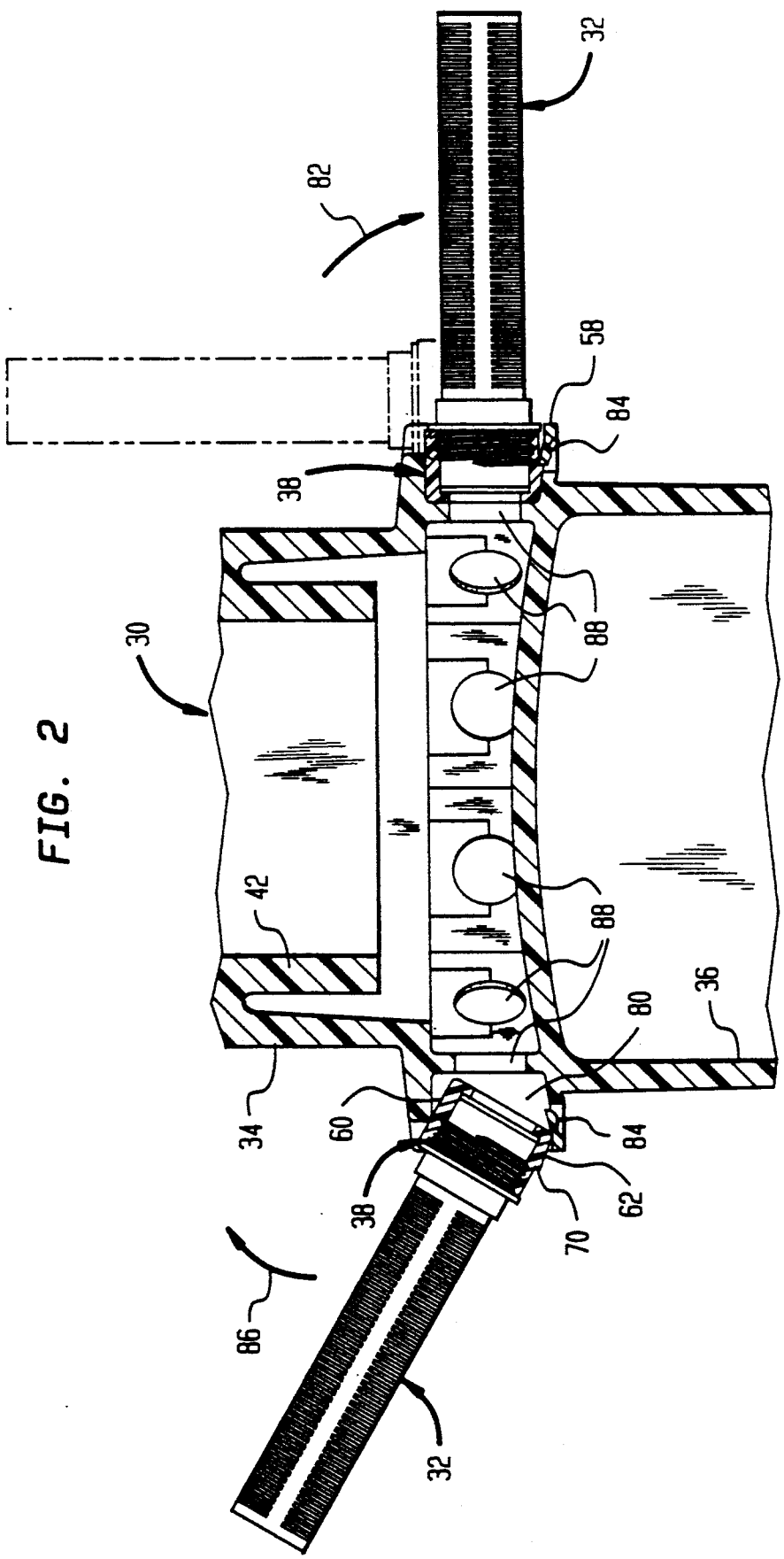
FIG. 2 is a longitudinal or vertical cross-sectional view of the underdrain assembly illustrated in FIG. 1, one lateral employed by the underdrain assembly having been moved from its unlocked position (shown in phantom) to its locked position (shown in solid) and another lateral employed by the underdrain assembly being shown as it is moved from its locked position to its unlocked position.

With particular reference to FIG. 2, the holder 30 includes an upper section 34, a lower section 36 and a plurality of connectors 38 pivotally mounted therebetween. The upper section 34 of the holder 30 is provided with a sleeve 42 adapted to receive the center pipe 28. The lower section 36 of the holder 30 is positioned atop the floor of the filter tank 12, thereby functioning as a base for the underdrain assembly 26. The connectors 38, which are arranged in a continuous circular array around the periphery of the holder 30, surround a collection compartment 40 located within the holder 30.

Figure 3:
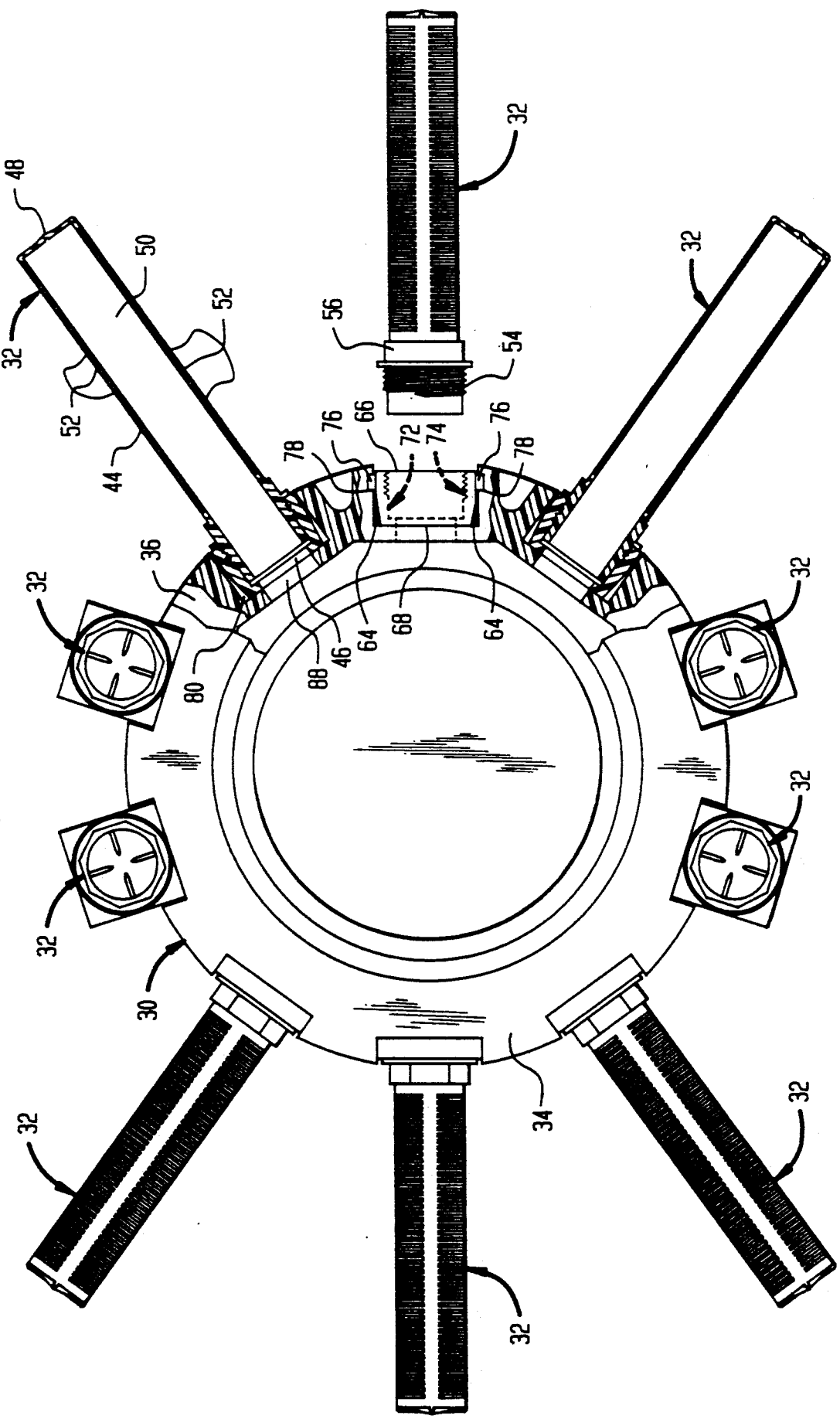
FIG. 3 is a top plan view, portions of which are broken away or removed to facilitate consideration and discussion, of the underdrain assembly illustrated in FIG. 2, some laterals being shown in their locked positions, other laterals being shown in their unlocked positions, and yet another lateral being shown in an exploded fashion.

Referring now to FIG. 3, each of the laterals 32 includes an elongated tube 44 having an open end 46, an opposing closed end 48, and an internal conduit 50 extending therebetween. An outer circumferential surface of each of the laterals 32 is provided with four series of slits 52, each slit providing a path of communication between the internal chamber 14 of the filter tank 12 and the internal conduit 50 of a corresponding one of the laterals 32. The slits 52 are dimensioned to allow filtered water to flow into the internal conduit 50, while blocking the passage of the filtrate medium. The open end 46 of each of the laterals 32 is provided with external threads 54, a hex nut 56 being attached to the tube 44 between the series of slits 52 and the external threads 54. The hex nut 56 and the external threads 54 facilitate the attachment and detachment of the laterals 32 to and from their corresponding connectors 38 in a manner which will be described hereinafter. The laterals 32, which perform a water collecting function, are preferably made of a synthetic organic plastic such as ABS.

With reference to FIGS. 2 and 3, each of the connectors 38 includes a body 58 having upper and lower walls 60 and 62, respectively, opposing sidewalls 64, a front end 66, and a rear end 68. A notch 70 is provided in the lower wall 62 for a purpose to be described hereinafter. A passageway 72 extends through each of the connectors 38 from the front end 66 thereof to the rear end 68 thereof. The passageway 72, whose function will also be described hereinafter, is provided with internal threads 74 adapted to threadedly engage the external threads 54 on a corresponding one of the laterals 32. Projections 76, which extend from the sidewalls 64 of each of the connectors 38, are received within openings 78 formed at the junction between the upper section 34 of the holder 30 and the lower section 3 of the holder 30. The projections 76 can rotate within the openings 78 to thereby allow each of the connectors 38 to pivot within a corresponding socket 80 formed in the periphery of the holder 30 between the upper section 34 thereof and the lower section 36 thereof.

With particular reference now to FIG. 2, each of the connectors 38 can pivot between a non-operating position, in which its associated lateral 32 is arranged generally vertically, and an operating position, in which its associated lateral 32 is arranged generally horizontally. As the connectors 38 and hence the laterals 32 are pivoted from their non-operating positions to their operating positions (see arrow 82), the lower wall 62 of each of the connectors 38 engages a resilient finger 84 which projects upwardly from the bottom of a corresponding one of the sockets 80. Due to its resiliency, the finger 84 is deflected downward until the connector 38 has reached its operating position. With the connector 38 in its operating position, the elastic memory of the material from which the finger 84 is made causes the finger 84 to move upward toward its normal, undetected position. Such upward movement of the finger 84 causes it to engage the notch 70 provided in the lower wall 62 of the connector 38, whereby the connector 38 is releasably locked in its operating position such that it can be subsequently moved from its operating position as indicated by arrow 86. Alternatively, the notch 70 and the finger 84 can be designed as an irreversible locking mechanism which permanently locks the connector 38 in its operating position (i.e., the connector 38 cannot be moved from its operating position without destroying the locking mechanism).

With particular reference now to FIG. 3, when the connectors 38 and hence the laterals 32 are in their operating positions, whether being locked in such positions reversibly or irreversibly, the internal conduits 50 of the laterals 32 are aligned with the passageways 72 of the connectors 38 and with openings 88 in the holder 30 to thereby provide a continuous flow path between the internal chamber 14 of the filter tank 12 and the collection compartment 40 of the holder 30. Because the laterals 32 are locked in their operating positions, their subsequent misalignment is prevented, thereby insuring effective filter operation.

In order to insert the underdrain assembly 26 into the filter tank 12, the connectors 38 are pivoted into their non-operating positions such that the laterals 32 associated therewith assume a generally vertical orientation. Lugs (not shown) on the connectors 38 cooperate with recesses (not shown) formed in the holder 30 to releasably retain the connectors 38 and laterals 32 in their non-operating positions. The underdrain assembly 26 is then inserted into the filter tank 12 through the opening in the top thereof. Once the underdrain assembly 26 has been properly positioned on the bottom of the filter tank 12, the connectors 38 and the laterals 32 can be pivoted from their non-operating positions into their operating positions.

If one of the laterals 32 must be replaced, a person merely reaches down into the filter tank 12, unscrews the lateral 32 from its associated connector 38 and then removes the lateral 32 from the filter tank 12. A new lateral would then be inserted into the filter tank 12 and screwed into the connector 38 from which the old lateral was removed.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

We claim:

1. In combination, a swimming pool filter and an underdrain assembly contained within said filter, said underdrain assembly including a housing having a plurality of openings therein; a plurality of collecting means for collecting filtered water; a plurality of pivoting means for pivotally mounting said plurality of collecting means to said housing such that each of said collecting means is pivotable between a non-operating position, in which it is out of alignment with a corresponding one of said openings in said housing, and an operating position, in which it is in alignment with said corresponding one of said openings in said housing, each of said pivoting means including a pivot member, which is pivotally mounted on said housing and which has a notch; connecting means for releasably and threadedly connecting each of said collecting means to a corresponding one of said pivot members, whereby each of said collecting means can be individually replaced by screwing it off of its corresponding pivot member without requiring removal of said underdrain assembly from said filter; and a plurality of locking means for locking each of said collecting means in its said operating position, whereby each of said collecting means is maintained in alignment with its corresponding one of said openings in said housing, each of said locking means including a resilient member mounted on said housing and being deflectable in response to the movement of a corresponding one of said collecting means from its said non-operating position to its said operating position to thereby engage said notch of a corresponding one of said pivot members.

2. A combination according to claim 1, wherein said connecting means includes external threads provided on each of said collecting means and internal threads provided on each of said pivot members.

3. A combination according to claim 2, wherein each of said pivot members includes a passageway extending therethrough, said passageway including said internal threads and providing a flow path between a corresponding one of said collecting means and said housing.

4. A combination according to claim 1, wherein each of said resilient members releasably engages said notch of its said corresponding one of said pivot members, whereby said collecting means are reversibly locked in their said operating positions.

5. A combination according to claim 1, wherein each of said resilient members permanently engages said notch of its said corresponding one of said pivot members, whereby said collecting means are irreversibly locked in their said operating positions.

6. In combination, a swimming pool filter and an underdrain assembly contained within said filter, said underdrain assembly including a housing having a plurality of openings therein; a plurality of collecting means for collecting filtered water; a plurality of pivoting means for pivotally mounted said plurality of collecting means to said housing such that each of said collecting means is pivotable between a non-operating position, n which it is out of alignment with a corresponding one of said openings in said housing, and an operating position, in which it is in alignment with said corresponding one of said openings in said housing; and connecting means for releasably and threadedly connecting each of said collecting means to a corresponding one of said pivoting means, whereby each of said collecting means can be individually replaced without requiring removal of said underdrain assembly from said filter.

7. A combination according to claim 6, further comprising retaining means for releasably retaining said collecting means in their non-operating positions.

8. In combination, a swimming pool filter and an underdrain assembly contained within said filter, said underdrain assembly including a housing having a plurality of openings therein; a plurality of collecting means for collecting filtered water; a plurality of pivoting means for pivotally mounting said plurality of collecting means to said housing such that each of said collecting means is pivotable between a non-operating position, in which it is out of alignment with a corresponding one of said openings in said housing, and an operating position, in which it is in alignment with said corresponding one of said openings in said housing; connecting means for releasably and threadedly connecting each of said collecting means to a corresponding one of said pivoting means, whereby each of said collecting means can be individually replaced without requiring removal of said underdrain assembly from said filter; and retaining means for releasably retaining said collecting means in their said non-operating positions.

9. A combination according to claim 6 or 8, further comprising a plurality of locking means for locking each of said collecting means in its said operating position, whereby each of said collecting means is maintained in alignment with its corresponding one of said openings in said housing.

10. A combination according to claim 9, wherein each of said locking means is reversible, whereby each of said collecting means is releasably locked in its said operating position.

11. A combination according to claim 9, wherein each of said locking means is irreversible, whereby each of said collecting means is permanently locked in its said operating position.

12. A combination according to claim 9, wherein each of said locking means includes a resilient member mounted on said housing and being deflectable in response to the movement of a corresponding one of said collecting means from its said non-operating position to its said operating position.

13. A combination according to claim 12, wherein each of said pivoting means includes a pivot member which is pivotally mounted on said housing and which has a notch sized and shaped so as to be engaged by a corresponding one of said resilient members when said pivot member supports a corresponding one of said collecting means in its said operating position.

14. A combination according to claim 13, wherein each of said resilient members releasably engages said notch of a corresponding one of said pivot members, whereby said collecting means are reversibly locked in their operating positions.

15. A combination according to claim 13, wherein each of said resilient members permanently engages said notch of a corresponding one of said pivot members, whereby said collecting means are irreversibly locked in their operating positions.

16. A combination according to claim 13, wherein said connecting means threadedly connects each of said collecting means to its said corresponding one of said pivot members, whereby said collecting means can be screwed onto and off of said pivot members.

* * * * *